(12) United States Patent
Hawkins et al.

(10) Patent No.: US 7,794,325 B2
(45) Date of Patent: Sep. 14, 2010

(54) DYNAMIC IN-GAME SOUNDTRACK FOR A CONSOLE GAME MACHINE

(75) Inventors: Dax H. Hawkins, Kirkland, WA (US); Manuel U. Bronstein, Redmond, WA (US); Megan L. Tedesco, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 855 days.

(21) Appl. No.: 11/281,793

(22) Filed: Nov. 17, 2005

(65) Prior Publication Data

US 2007/0124491 A1    May 31, 2007

(51) Int. Cl.
*A63F 13/00* (2006.01)
*H04L 9/32* (2006.01)

(52) U.S. Cl. .................................. 463/35; 713/201
(58) Field of Classification Search ............... 463/35, 463/40–42; 713/201, 181; 709/231, 219, 709/203; 715/716, 201; 84/609; 455/556.2
See application file for complete search history.

(56) References Cited

U.S. PATENT DOCUMENTS

| | | | |
|---|---|---|---|
| 5,925,843 A | 7/1999 | Miller et al. | 84/609 |
| 6,438,579 B1 * | 8/2002 | Hosken | 709/203 |
| 6,516,466 B1 | 2/2003 | Jackson | 725/62 |
| 2002/0094851 A1 | 7/2002 | Rheey | 463/1 |
| 2003/0182574 A1 * | 9/2003 | Whitten et al. | 713/201 |
| 2003/0227473 A1 * | 12/2003 | Shih et al. | 345/716 |
| 2004/0005923 A1 * | 1/2004 | Allard et al. | 463/35 |
| 2004/0137984 A1 | 7/2004 | Salter | 463/35 |
| 2005/0064935 A1 | 3/2005 | Blanco | 463/35 |
| 2005/0091597 A1 * | 4/2005 | Ackley | 715/716 |
| 2005/0240661 A1 * | 10/2005 | Heller et al. | 709/219 |

FOREIGN PATENT DOCUMENTS

| | | |
|---|---|---|
| EP | 0 919 964 A2 | 6/1999 |
| GB | 2 370 908 | 7/2002 |
| WO | WO 01/83055 A2 | 11/2001 |

OTHER PUBLICATIONS

"Online Gaming; What is an Online Game?", http://www.apple.com/games/gettingstarted/online/index.html#1.
"Xbox 360", http://www.xbox.com/en-us/xbox360/default.htm?level1=enushome&level2=fg3spw&level3=details.
"Yahoo Games; PlayStation 3", http://uk.videogames.games.yahoo.com/specials/playstation3.html.

* cited by examiner

*Primary Examiner*—Peter DungBa Vo
*Assistant Examiner*—Masud Ahmed
(74) *Attorney, Agent, or Firm*—Woodcock Washburn LLP

(57) ABSTRACT

Background audio for a game being played in a video game system is provided via streaming from an outside source. The background audio played is based on details regarding the state of the video game system, including information regarding the game being played on said video game system. The user can select from among several possibilities for background music, and the selection is then streamed to the video game system from the music service. Enforcement of digital rights and purchasing of tracks streamed from the music service are provided for.

18 Claims, 3 Drawing Sheets

Provide game experience
400

Accept streaming audio
410

Play streaming audio
420

DYNAMIC IN-GAME SOUNDTRACK FOR A CONSOLE GAME MACHINE

BACKGROUND

When a user is playing a video game on a video game system, generally the video game controls the sounds which are being played by the video game system, either directly through speakers on the video game system or through a connection to a monitor or television incorporating speakers, another device incorporating speakers, or separate speakers. Because the music content is limited to what is stored with the game, game music can be repetitive and become annoying to the game player.

One solution that some users employ is to mute the sound from the video game, via a control provided by the video game (e.g. a volume or mute function). In some cases the control allows the user to request selective muting, which mutes the game music. With selective muting, the user can choose to have only video game sound effects, and not the game music, playing from the video game system.

Another solution that some users employ is lowering the volume or muting completely the device through which the video game system is playing sounds. For example, if the video game system is connected to a television which is being used to display graphics and play sounds to the user, the user can mute the television to mute the sounds from the video game system. The user can then play music through another device. For example, a user who has muted the television can play music through a stereo system. However, this muting is not selective, and thus any game sounds such as dialogue and/or sound effects provided by the video game are muted as well as music provided by the video game.

In order to provide a user with flexibility in choosing background music for a video game, some video games provide a number of choices for background music. These choices of background music, however, are limited by the method of delivery of the video game. For example, if a video game is delivered on a disc medium, the disc medium will necessarily have a fixed size, and space to use for storing data for background music choices on the disc medium will be limited. Because these choices are limited, the background music choices can grow repetitive for a user.

A few video game consoles, e.g. the first version of Microsoft Corporation's XBOX® video game console, allow the user of a video game to request that the video game play user-selected music. For example, using such systems, a user could rip a music file, and request that the video game play that music file as background music for the video game while also providing the user with game sounds such as dialogue and/or sound effects. However, the playback of user-selected music is only possible when implemented by the video game being played, and a video game developer had the entire complex task of implementing the functionality which allowed a user to provide and select music.

Even where user-selected music can be played in a video game the user-selected music may not enhance the game experience. For example, a level in a video game may be best suited for eerie music. However, a user, not knowing this, may select happy music the user has ripped as background music while the game is played. This mismatch between the background music may detract from the user's experience of the video game. In addition, in order to have a variety of background music to choose from, the user must expend effort to load the music, for example by ripping a user-owned CD.

SUMMARY

A user is provided with the ability to play background music appropriate to a particular title on a video game system without limiting the selection of background music to selections included with a video game and without requiring the user to load music by ripping a user-owned CD.

A video game system allows for the provision of background music from an online music service. In order to provide appropriate background music for the video game, some data about the video game is provided to the online music service or used to select from a group of online music services or music channel stations. Additional game data, such as a user id or other information about the user, a character or level that the user has achieved, or other game data, may be provided to the online music service.

The online music service, in response, provides dynamic streaming audio content to the video game system. A background application on the video game system plays the streaming audio as background music, regardless of whether the video game developer has included functionality to allow user-selected music to be played. Streaming audio may be any form of audio, from specific individual tracks (discrete audio files), to playlists consisting of a number of tracks, to a "station" providing continuous audio, which may be composed of individual tracks, possibly interspersed (as in radio) with other audio narration or with commercials.

In one embodiment, the user of the video game system is presented with a number of options for different streams from the online music service. Track and artist information, for example, is presented for each stream. In one embodiment, additional option information is also presented to the user in order to assist the user in selecting one of the options. For example, ratings and comments from other users are presented in order to assist the user in selecting a stream. In addition, the user's ratings and comments may be sent to the music service for incorporation into the option information served by the music service to users. In addition, in some embodiments there are specific radio-like "stations," as describe above, available dedicated to particular genres, for example, the racing station, or first person shooter station. Such stations provide the user with music particularly well-suited for the given game type.

In one embodiment, data about the played stream is stored by the video game system. This allows a user to view a list of tracks or streams previously played by the video game system. In one embodiment, a digital rights management system is used to protect the data served by the music service. The digital rights management system is used to ensure that the audio served by the music service to the video game system is played only in accordance with the permissions set by the owner of the rights to the audio.

In one embodiment, a user may decide to purchase an audio track heard in the audio stream from the online music service. This purchase will result in purchase response data being served from the music service to the user. The purchase response data in one embodiment is a copy of the audio track along with information (e.g. a DRM license) which enables the user to use the audio track in some context.

Only some embodiments of the invention have been described in this summary. Other embodiments, advantages and novel features of the invention may become apparent from the following detailed description of the invention when considered in conjunction with the drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

EXEMPLARY GAMING SYSTEM

Figure 1:
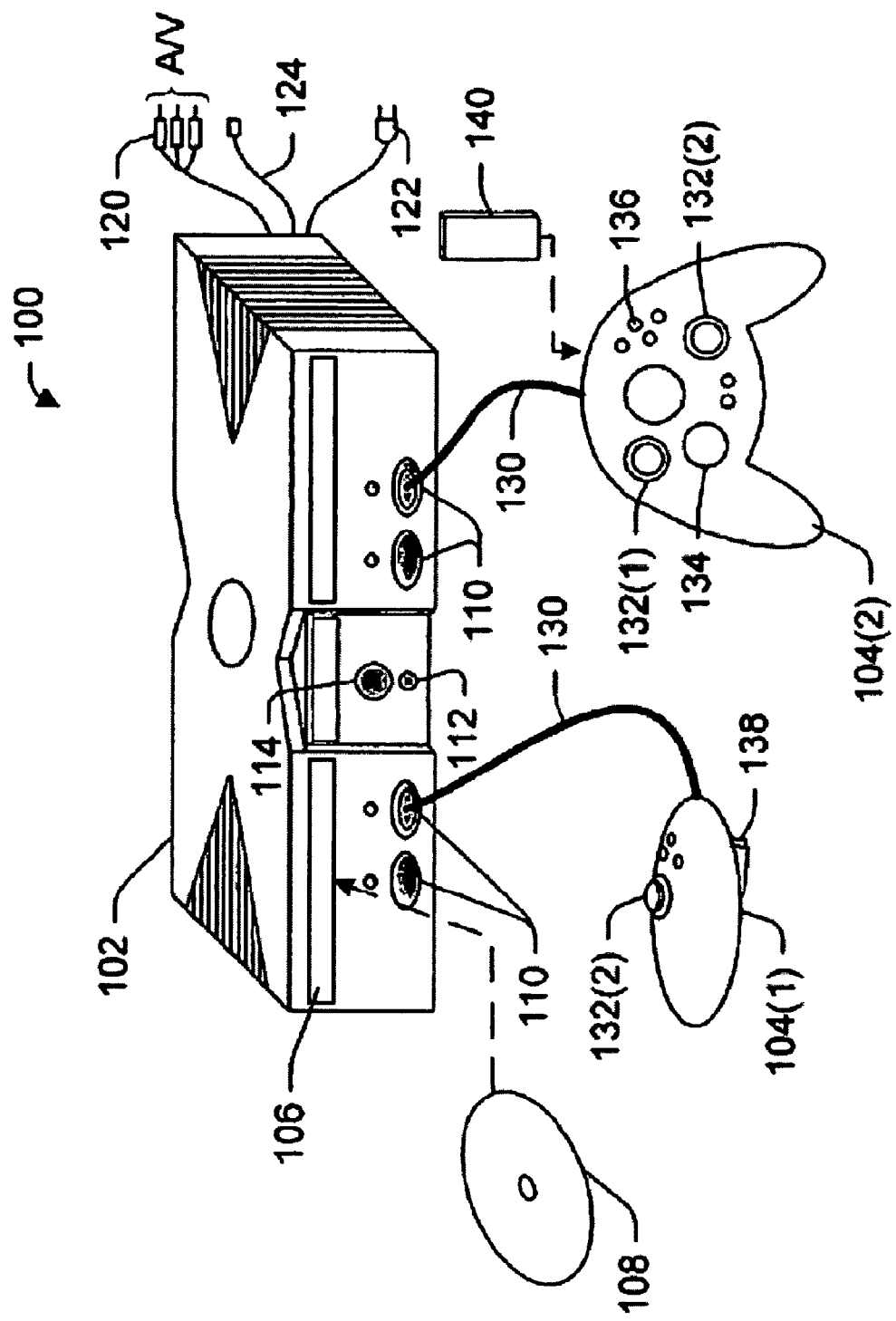
FIG. 1 illustrates a gaming system that implements a uniform media portal architecture.

FIG. 1 shows an exemplary gaming system 100. It includes a game console 102 and up to four controllers, as represented by controllers 104(1) and 104(2). The game console 102 is equipped with an internal hard disk drive and a portable media drive 106 that supports various forms of portable storage media as represented by optical storage disc 108. Examples of suitable portable storage media include DVD, CD-ROM, game discs, and so forth.

The game console 102 has four slots 110 on its front face to support up to four controllers 104, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the optical storage disc 108.

Game console 102 connects to a television or other display (not shown) via A/V interfacing cables 120. A power cable 122 provides power to the game console. The game console 102 may further be configured with broadband capabilities, as represented by the cable or modem connector 124 to facilitate access to a network, such as the Internet.

Each controller 104 is coupled to the game console 102 via a wire or wireless interface. In the illustrated implementation, the controllers are USB (Universal Serial Bus) compatible and are connected to the console 102 via serial cables 130. The controller 102 may be equipped with any of a wide variety of user interaction mechanisms. As illustrated in FIG. 1, each controller 104 is equipped with two thumbsticks 132(1) and 132(2), a D-pad 134, buttons 136, and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and port them for play on other consoles. In the described implementation, each controller 104 is configured to accommodate two memory units 140, although more or less than two units may be employed in other implementations.

The gaming system 100 is capable of playing, for example, games, music, and videos. With the different storage offerings, titles can be played from the hard disk drive or the portable medium 108 in drive 106, from an online source, or from a memory unit 140. A sample of what the gaming system 100 is capable of playing back include:

1. Game titles played from CD and DVD, from the hard disk drive, or from an online source.

2. Digital music played from a CD in the portable media drive 106, from a file on the hard disk drive (e.g., Windows Media Audio (WMA) format), or from online streaming sources.

3. Digital audio/video played from a DVD disc in the portable media drive 106, from a file on the hard disk drive (e.g., Active Streaming Format), or from online streaming sources.

Figure 2:
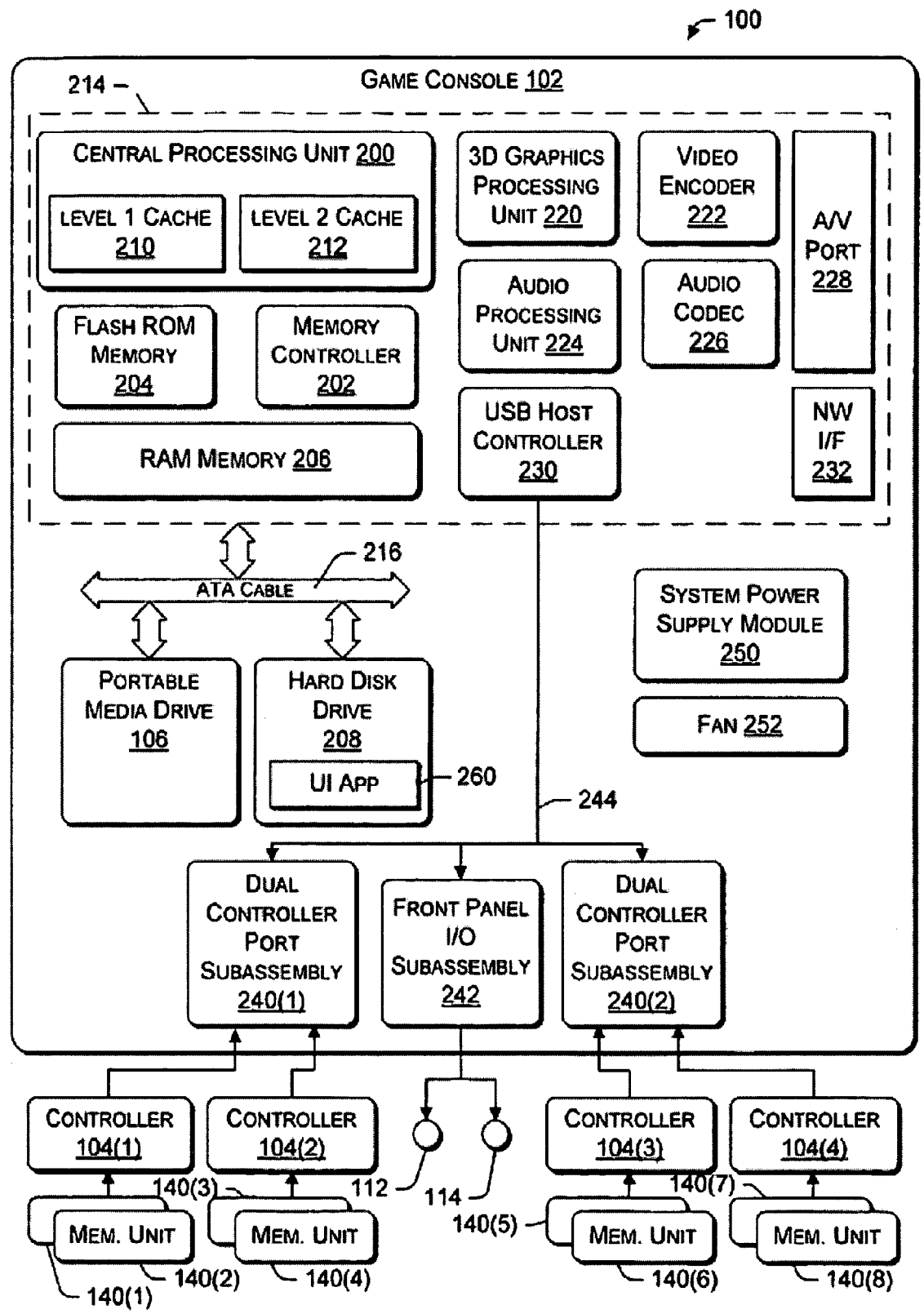
FIG. 2 is a block diagram of the gaming system.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus, also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR it SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., Internet, home network, etc.) and may be any of a wide variety of various wired or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types—game data, audio data, and video data—regardless of the media type inserted into the portable media drive 106.

To implement the uniform media portal model, a console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community. The network interface 232 may connect to a network. Such a network may be public (e.g. the Internet), private (e.g. a residential local area network (LAN)) or some combination of public and private. Such a network may introduce another memory source available to individual gaming systems 100—online storage. In addition to the portable storage medium 108, the hard disk drive 208, and the memory unit(s) 140, the gaming system 100(1) can also access data files available at remote storage locations via the network.

Dynamic In-Game Soundtrack in a Gaming System

Figure 3:
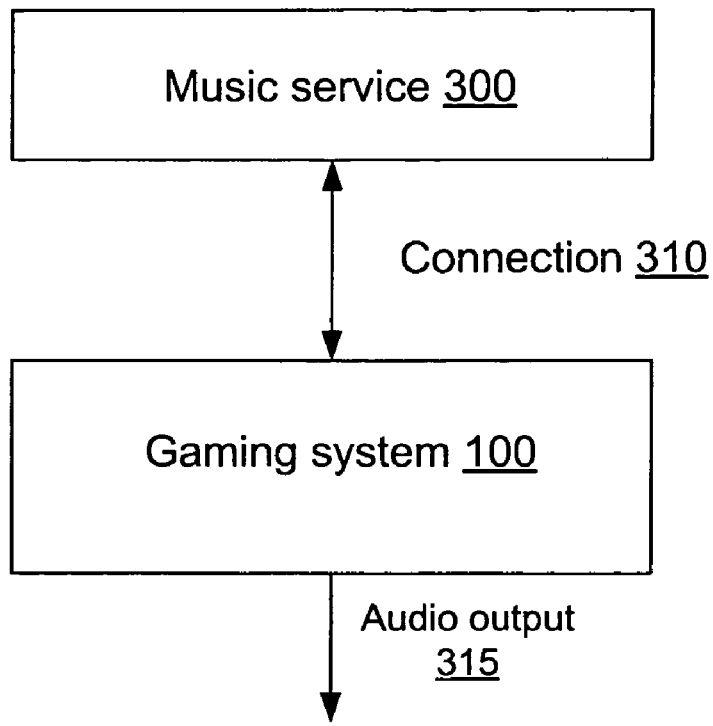
FIG. 3 is a block diagram of the interaction of a gaming system with a music service according to one embodiment of the invention.

FIG. 3 is a block diagram of the interaction of a gaming system with a music service according to one embodiment of the invention. In order to provide the user with an improved video game experience, a user who is playing a video game title on a gaming system 100 is provided with the ability to use an outside source to stream background music while still listening to game sounds (such as dialogue or effects) which are provided by the video game title. As shown in FIG. 3, gaming system 100 communicates with a music service 300 via a connection 310. The connection 310 between gaming system 100 and the music service 300 may be of any type, including via the Internet or other such network, and may be a hybrid of several types of connection for different types or direction of communication or at different times.

Via connection 310, the gaming system 100 provides information to the music service 300 regarding the game being played (or about to be played) on gaming system 100. In one embodiment, identifying information regarding the game being played is provided to the music service 300. The music service 300 then provides the gaming system 100 with information regarding possible music to be used with the game; this information is then presented to the user in order to allow the user to select from the available options.

In one embodiment, in addition to identifying information regarding the game, other game data, such as a user id or other information about the user, a character or level that the user has achieved, or other game data, may be provided to the online music service 300. This allows the music service 300 to provide specialized options for music to be played in the background of the game.

Figure 4:
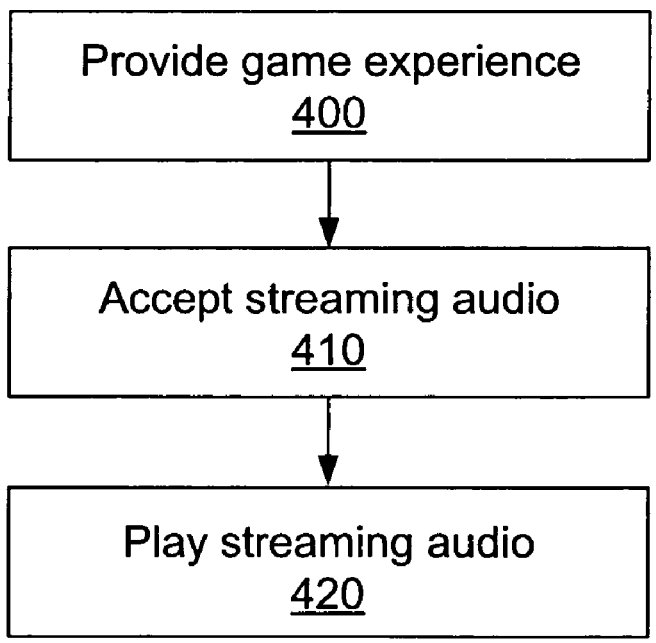
FIG. 4 is a flow diagram showing the provision of a dynamic in-game soundtrack according to one embodiment of the invention.

FIG. 4 is a flow diagram showing the provision of a dynamic in-game soundtrack according to one embodiment of the invention. As shown in FIG. 4, a game experience is provided to a user using a game application in step 400. Streaming audio data is accepted from a streaming audio content provider (e.g. music service 300) via a network in step 410. In step 420, at least a portion of the streaming audio data is played. While the steps are shown in series, the provision of a game experience to the user and the playing of a portion of the streaming audio data may be performed in parallel or overlapping in any way. In some embodiment of this invention, the streaming audio accepted from the streaming audio content provider is based on the state of the game experience provided in step 400, and in some embodiments also on user feedback.

With reference again to FIG. 3, in one example, the gaming system 100 provides the user with information regarding a choice among different types of background music, different genres of background music and/or different playlists. Additionally, the gaming system 100 allows the user to use the options presented by the music service 300 (via the gaming system 100) to compile a playlist from different combinations of tracks or playlists and request that playlist from the music service 300.

In some embodiments, no options are presented to a user. For example, a game may be provided which includes the option of having a dynamic music soundtrack streamed for the game, but where the dynamic music soundtrack streamed is dependent only on the state of gameplay and not on any explicit selections made by the user. In such an embodiment, no options information is presented to the user.

In some embodiments, when the music service 300 receives via connection 310 information indicating that gaming system 100 is being used to play a specific title of a game, and that the user has reached a certain level, and is playing as a specific character. The music service 300 then sends option information to the gaming system 100. The gaming system 100 presents these options to the user. Options may be presented to the user via a heads-up display (HUD) interface. The HUD interface is presented by the gaming system 100 separately from the game application, and in some embodiments appears in place of or overlapping the display from the game. In an alternate embodiment, the options are presented to the user via the game application. Thus, for example, instead of seeing a background music options on a HUD interface, the game application may show the user a radio in the context of the game application, and allow the user to look at the channel possibilities and select a station. Or, alternately, the game application simulates a house with a shelf of CDs, and allows the user to examine and select a CD to play.

In some embodiments, the options presented include genres of music. Thus, in the case where the game application simulates a radio, different stations may play different genres of music—there may be a country channel, a hip-hop channel, etc. Selecting a channel corresponds to selection of an audio stream from the music service 300.

In some embodiments, the options available also include playlists comprising individual tracks of music. Thus, a user may be able to select a playlist after examining a playlist title, or, if provided, examining the track listing for the playlist. In other embodiments, the user may be able to create a playlist from track options provided from the music service 300. In this way, the player can build a playlist of tracks to play which are then requested from the music service 300.

In some embodiments, the music service 300 serves a stream consisting of the tracks requested. In other embodiments, the gaming system 100 requests the tracks from the music service 300 and provides the user with the playlist experience. The data is then provided to the user via an audio output 315. (As shown in FIG. 1, this may be via A/V interfacing cables 120; alternately, audio output 315 is another audio output means such as (without limitation) a speaker.)

While the music service 300 is described above as both communicating with the gaming system 100 to provide option information and serving the audio stream, these two functions may be performed by different components. For example, the music service 300 may provide options and accept the user's choice for background music. The serving of the audio stream to the gaming system 100 may be done by a separate service. Such separate service may be connected to the gaming system 100 via connection 310 or via a separate connection. The serving of the audio stream in some embodiments is performed using the music service 300 as a broker or intermediary.

Ranking/Responses from User to Music Service 300

In some embodiments, the music service 300 accepts (via connection 310) rankings or other responses from the user. These rankings or responses (such as comments about specific tracks or playlists) can be collected in order to provide users with ranking information or other collected information from a group of users regarding the options available to users.

Thus, for example, when a user sees, as an option, a playlist for playing with a specific game title, the user can view the ratings and comments that other users have given to that playlist. The user may also add the user's own ratings and comments regarding the playlist. This may be handled through the game application or via the HUD interface.

In one embodiment, in addition to being collected for possible display to future users, user information including user ratings and comments is used to implement collaborative filtering. Such collaborative filtering presents a user with content or with content options based on the user's history of usage, ratings, or comments. Thus, if many users highly rate tracks A, B, and C, and a user U provides high ratings for tracks A and B, track C is provided or suggested to user U. For example, if user U is receiving options to select from for inclusion in the audio stream being received by user U, then track C is included among the options. Alternately, where several users who have rated tracks A and B highly are receiving a specific music station stream, track C will be included in the stream. In an alternate embodiment, a user may receive content or options based on a selected other user or users. Thus, a user U receives content or content options based on the ratings of a specific other user.

Thus, where option data is presented to a user, the option data is based at least in part on the user ratings of the particular user, of collaborators (other users) similar to the user, or a combination of the two.

Authentication and Digital Rights Management

In some embodiments, the gaming system 100 includes a digital rights management module. This module provides digital rights management for the audio stream. Digital rights management systems allow the owner of rights in an audio track to permit use of the audio track only under specific conditions. The digital rights management module acts as part of the digital rights management system.

Thus, in one embodiment, the audio stream received by the gaming system 100 may be received in an encoded or otherwise unusable form. The digital rights management module performs tasks which result in a usable form of a portion of the audio stream, which can then be played for the user. The digital rights management module may also perform other security features or enforce the conditions under which the audio track can be used.

In some embodiments, authentication is provided which allows the music service 300 to authenticate the identity or the permissions for gaming system 100. For example, if a user has certain rights to stream audio from a music service, an authentication module in gaming system 100 may be used to authenticate the user so that the music service 300 can stream audio for which the user has rights.

In some embodiments, a user has certain privileges associated with that user's account with a provider other than music service 300. In these embodiments, the user's rights associated with the user's account with that other provider determine their rights to use at least one of the audio streams provided via music service 300. In other embodiments, a user has certain privileges associated with that user's account with music service 300, and those privileges are used to determine their rights to use audio streams provided via music service 300.

Previously-Played List

In some embodiments, information regarding tracks included in audio streams served from the music service 300 is stored in the gaming system 100. This information (the "previously-played list") can be displayed to the user upon request. In some embodiments, this display of track information occurs via a HUD interface. In other embodiments, display of track information occurs via a second interface, or via the game application. This display of track information allows the user to see which tracks have been played as background music.

In some embodiments, the previously-played list is cached by the music service 300 and can be used through a device other than gaming system 100, such as a PC, mobile phone, or other device. For example, if a user plays a game and hears a song as background music, the user can then access their previously-played list from her phone, and the user can then request that that music be used as a ring tone on her phone.

The previously-played list, in some embodiments, includes not only the music which was played in the background which has been received from the music service 300, but all music played, from whatever source. Thus, information regarding music from the music service 300 would be on the previously-played list, as would music originating from the game being played, music the user has ripped from a CD and played, and all other music from other sources.

In one embodiment, a user may decide to purchase an audio track heard in the audio stream from the music service 300. When this purchase occurs, purchase response data being served from the music service to the user. The purchase response data in one embodiment is a copy of the audio track along with information which enables the user to use the audio track in some context. In one embodiment, the purchase response data includes a digital rights management (DRM) license which allows the user to use the purchased track according to certain conditions.

In some embodiments, audio data relating to previously played tracks is stored in an encoded or otherwise unusable form by the gaming system 100. In some such embodiments, the purchase response data received from music service 300 is unlocking data which can be used to render a purchased track in usable form.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for providing a gaming experience to a user on a computer network server, said method comprising computer-implemented steps of:
   providing a game experience using a game application;
   providing user game session data comprising a user id, character level, and character game achievements associated with said game experience to a streaming audio content provider;
   streaming selected dynamic audio data for the gaming experience during game play from said streaming audio content provider wherein selection of the dynamic audio data is dependent upon a state of the gaming experience and ratings from a plurality of users according to said user game session data;
   accepting the streaming dynamic audio data from a streaming audio content provider via said network; and
   playing at least a portion of said streaming dynamic audio data.

2. The method of claim 1, where said providing a game experience comprises playing game audio.

3. The method of claim 1, where said step of accepting streaming dynamic audio data from a streaming audio content provider comprises:
   providing session data regarding said game experience to said streaming dynamic audio content provider;
   accepting option data regarding options for available streams of audio data from said streaming audio content provider;
   presenting said option data to said user;
   accepting from said user selection data regarding said option data;
   providing said user selection data to said streaming audio content provider; and
   accepting said streaming dynamic audio content, according to said user selection data, from said audio content provider.

4. The method of claim 3, where said option data is based at least in part on at least one user rating, each of said user ratings corresponding to a rating given by said user to an item of audio content.

5. The method of claim 4, where said option data is based at least in part on at least one collaborator rating, each of said collaborator ratings corresponding to a rating given by a collaborator other than said user to an item of audio content.

6. The method of claim 1, further comprising:
   accepting track data from said streaming audio content provider, said track data describing said streaming dynamic audio data.

7. The method of claim 6, further comprising:
   displaying said track data to said user, said track data comprising data describing a specific track;
   accepting a purchase request from said user, said purchase request relating to said specific track; and
   receiving purchase response data from said streaming audio content provider, where said purchase response data allows said user to store a copy of said specific track and to use said copy of said specific track.

8. The method of claim 1, where said streaming dynamic audio data is encoded, and where said step of playing at least a portion of said streaming dynamic audio data comprises:
   determining whether said user should be allowed to use said streaming dynamic audio data during game play; and
   if said user should be allowed to use said streaming dynamic audio data, decoding said portion of said streaming dynamic audio data into unencoded streaming audio data; and
   playing said unencoded streaming dynamic audio data.

9. A system for providing a gaming experience to a user, comprising:
   a game application execution module for executing a game application;
   a music service communicator for providing game execution data regarding said execution of said game application to a music service and for receiving streaming dynamic audio data from said music service, said music service communicator operably connected to said game application execution module;
   a music service filter used to implement preferential collaborative filtering of streaming dynamic audio data based upon collected user history information and game execution data comprising a user id, character level, and character game achievements as provided to said music service by said music service communicator, said music service filter operably connected to said game application execution module;
   an audio output, operably connected to said game application execution module and said music service communicator, for outputting audio to said user during game play, said audio comprising at least a portion of said dynamic audio streaming data.

10. The system of claim 9, where said system further comprises:
    an option display, operably connected to said music service, for accepting option data regarding options for available streams of audio data from said streaming audio content provider and presenting said option data to said user;
    and where said music service communicator accepts from said user selection data regarding said option data, provides said user selection data to said streaming audio content provider; and accepts said streaming dynamic audio content, according to said user selection data, from said audio content provider.

11. The system of claim 9, where said music service communicator further comprises:
a display for displaying track data to said user, said track data comprising data describing a specific track;
a purchase request acceptor for accepting a purchase request from said user, said purchase request relating to said specific track; and
purchase response data module for receiving purchase response data from said streaming audio content provider, where said purchase response data allows said user to store a copy of said specific track and to use said copy of said specific track.

12. The system of claim 9, where said streaming dynamic audio data is encoded, and where said system further comprises:
a digital rights module for enforcing a digital rights management system which governs the conditions under which said user can use a said streaming dynamic audio data, said digital rights module operably connected to said music service communicator.

13. The system of claim 12, where said system further comprises:
a decoder for decoding said streaming dynamic audio data into a usable form, operably connected to said digital rights module.

14. A computer-readable storage medium having a tangible physical structure comprising computer-executable instructions for providing a gaming experience to a user, said computer-executable instructions for performing steps comprising:
providing a game experience using a game application;
providing user game session data comprising a user id, character level, and character game achievements associated with said game experience to a streaming audio content provider;
streaming selected dynamic audio data for the gaming experience during gameplay from said streaming audio content provider wherein selection of the dynamic audio data is dependent upon a state of the gaming experience and ratings from a plurality of users according to said user game session data;
accepting streaming dynamic audio data from a streaming audio content provider via a network; and
playing at least a portion of said streaming dynamic audio data.

15. The computer-readable storage medium of claim 14, where said step of accepting streaming dynamic audio data from a streaming audio content provider comprises:
providing session data regarding said game experience to said streaming audio content provider;
accepting option data regarding options for available streams of audio data from said streaming audio content provider;
presenting said option data to said user;
accepting from said user selection data regarding said option data;
providing said user selection data to said streaming audio content provider; and
accepting said streaming dynamic audio content, according to said user selection data, from said audio content provider.

16. The computer-readable storage of claim 14, said steps further comprising:
accepting track data from said streaming audio content provider, said track data describing said streaming dynamic audio data.

17. The computer-readable storage of claim 16, said steps further comprising:
displaying said track data to said user, said track data comprising data describing a specific track;
accepting a purchase request from said user, said purchase request relating to said specific track; and
receiving purchase response data from said streaming audio content provider, where said purchase response data allows said user to store a copy of said specific track and to use said copy of said specific track.

18. The computer-readable storage of claim 14, where said streaming audio data is encoded, and where said step of playing at least a portion of said streaming dynamic audio data comprises:
determining whether said user should be allowed to use said streaming dynamic audio data; and
if said user should be allowed to use said streaming dynamic audio data, decoding said portion of said streaming dynamic audio data into un-encoded streaming audio data; and
playing said un-encoded streaming dynamic audio data.

* * * * *